United States Patent Office 3,528,819
Patented Sept. 15, 1970

3,528,819
ELIMINATING UNDESIRABLE TASTE
FROM COFFEE AND TEA EXTRACTS
AND PRODUCTS
Robert M. Hamilton, La Grange Park, and Robert E. Heady, Park Forest, Ill., assignors to CPC International Inc., New York, N.Y., a corporation of Delaware
No Drawing. Filed Feb. 16, 1967, Ser. No. 616,471
Int. Cl. A23f 1/08, 3/00
U.S. Cl. 99—71                                    3 Claims

ABSTRACT OF THE DISCLOSURE

Extracted beverage products such as coffee and tea are treated to reduce or eliminate objectionable taste factors arising from the extraction process such as by overbrewing or overlong steeping. The objectionable taste factors are counteracted by treating the beverage product with a small but effective amount of a cyclodextrin and the like.

This invention relates to improved extracted beverage compositions that have been treated to reduce or to remove completely undesirable taste factors. The invention also relates to processes for preparing such improved beverage compositions.

Aqueous extracted beverage compositions, such as coffee and tea, have widespread and popular appeal to consumers, primarily because of their flavors, but also because of other properties such as their mild stimulating effects. Occasionally, such beverages include undesirable taste factors which originate in the extraction process. Such factors may arise from overcooking coffee or tea, that is, continuing the hot water extraction of the coffee or tea until unpleasant taste factors are extracted in addition to the desirable flavor factors. Such undesirable taste factors may also arise from extended standing of the liquid beverage, either in contact with the coffee bean or tea leaves, during which extraction may continue, or simply upon prolonged exposure to the atmosphere.

Undesirable tastes may also originate from immature or bitter beans or leaves, or from extraction processes that are too severe, or in other ways.

The unpleasant taste factors most commonly are sensed as bitterness, but may also be described such as acrimonious, sour, an "off taste," and the like. To offset the likelihood of an occurrence of undesirable taste factors, particularly those arising because of the extraction process skill and care of a high degree are required in the brewing, steeping or other extraction process that is employed. If undesirable taste principles develop in an extract, whether from the extraction process or otherwise, they generally carry over into any concentrate form that is made fom the extract, whether liquid or solid. The removal of such undesirable taste factors, or their reduction to an acceptable level, are generally considered to be desirable, and the failure to reduce or eliminate bitter or other undesirable principles from beverage extracts has reduced their consumption and acceptability in some cases, and in other cases has led to masking techniques by the introduction of other strong flavoring agents that mask the true beverage flavor to some extent, as well as the bitter principle, but that are acceptable.

One primary object of this invention is to provide an improved extracted beverage product that has little or no objectionable taste or flavors.

Another object of this invention is to provide an improved extracted beverage composition that may be obtained without the need for using less severe extraction processes than would ordinarily be employed.

A related object of the invention is to provide a practical process for removing or reducing undesirable taste principles in extracted beverage products, that is simple, effective, and compatible with existing processing techniques, and that permits more severe extraction conditions than are now feasible.

Still another object of the invention is to provide an improved extracted beverage composition, such as, for example, a tea or coffee beverage product, in different forms such as the whole extract, liquid concentrate, and solid concentrate in granular or powdered form, in which any bitter principles have been reduced or from which any bitter principles have been eliminated.

Another object of this invention is to provide an improved beverage product and composition which include an ingredient that tends to reduce or to eliminate objectionable flavors but that imparts no objectionable flavor itself to the beverage when in form for consumption.

Still another object of this invention is to provide improved concentrated beverage compositions that can be reconstituted by the addition of water to provide ingestible full strength beverages, that are characterized by the absence or substantial absence of objectionable flavor factors therein.

Another object of this invention is to provide a practical method for preparing beverage compositions of the foregoing types, in which the occurrence of objectionable taste factors is markedly reduced or eliminated.

Other objects of the invention will readily occur to those skilled in the art from the specification and from the appended claims.

It has been found that extracted beverages such as, for example, tea and coffee, may be improved, particularly to counteract the undesirable taste factors from severe extraction conditions, in accordance with one preferred embodiment of this invention, by bringing the beverage into intimate contact with a small but effective amount of cyclodextrin. The cyclodextrin may be added directly to the full strength beverage, or to its concentrated forms following partial or total water removal. If the cyclodextrin is added to a concentrate, the concentrate may then be concentrated further, dried, or frozen, without destroying the cyclodextrin and without impairing its beneficial effects.

The cyclodextrins are a group of homologous oligosaccharides that are obtained from starch by the action of enzymes elaborated by *Bacillus macerans*. The cyclodextrins are known as Schardinger dextrins from an early investigator who studied these materials. They are homologous cyclic molecules containing 6 or more α-D-glucopyranose units linked together at the 1,4 positions as in amylose. The cyclic molecule may also be referred to as a torus. As a consequence of the cyclic arrangement, this torus is characterized by having neither a reducing end group nor a non-reducing end group. The torus molecule is depicted in the following schematic formula, where the hydroxyl groups are shown in the 2, 3 and 6 positions in the illustrated anhydroglucose units. The letter $n$ may be a number from 4 to 6, or higher.

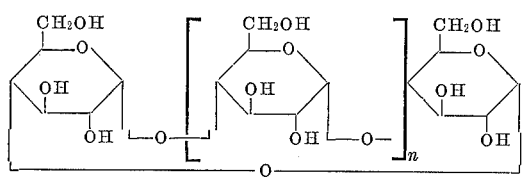

When $n$ is 4, the torus molecule is known as α-cyclodextrin or cyclohexaamylose, because the torus contains six anhydroglucose units; when $n$ is 5, the seven unit member is known as β-cyclodextrin or cycloheptaamylose; and when $n$ is 6, the eight unit member is known as γ-cyclodextrin or cyclooctaamylose. When reference is made herein to "cyclodextrin," it is intended to include the foregoing forms as well as still other tori that have a still larger number of units in the molecule, and, as well, mixtures of these and other homologs.

Cyclodextrin is produced from starch by the action of an enzyme commonly known as cyclodextrin transglycosylase (*B. macerans* amylase). The source of the enzyme is usually a culture of *Bacillus macerans* which is grown under conventional conditions on conventional media containing sources of nitrogen, carbon, growth factors and minerals. The cyclodextrin transglycosylase may be produced by following published teachings such as, for example, those described by D. French in Methods in Enzymology, S. P. Colowick and N. O. Kaplan, editors, Academic Press, New York, N.Y., vol. V, 1962, pp. 148–155.

The cyclodextrin transglycosylase activity in cultures of *Bacillus macerans* may be measured by the Tilden-Hudson procedure as described by these two workers in J. Bacteriol, 43, 527–544, 1942. In general, the cyclodextrin transglycosylase is added as a dilute solution of a gelatinized starch, whereupon a conversion to cyclodextrin occurs by enzymolysis. Procedures for making and isolating the cyclodextrins have been variously described as by F. Cramer and D. Steinle, Ann., 595, 81 (1955). If desired, the various homologs such as, for example, the alpha, beta, and gamma, may be fractionated by procedures such as those described by D. French, et al., J. Am. Chem. Soc., 71, 353 (1949).

The various homologous cyclodextrins, having from six to eight units, or higher, and their mixtures, may be used as equivalent materials for the purposes of this invention. In practice, there may be little reason for separating the various fractions, and the cyclodextrin employed may contain a preponderance of $\beta$-cyclodextrin, for example. No distinction is intended between the various homologous cyclodextrins or their mixtures unless otherwise indicated, when using the term "cyclodextrin."

The amount of cyclodextrin that is required for the treatment of a given extracted beverage composition, in accordance with the preferred embodiment of the invention, will depend upon the amount of bitter principle that is present in the beverage composition. The amount of cyclodextrin required can be determined on a trial and error basis, or, for processing convenience, a preselected amount of cyclodextrin can be used consistently. A slight under-usage may be tolerable, and the use of a slight excess is harmless. Only a small amount of cyclodextrin is required, generally, less than about 1% by weight of the liquid beverage in the full strength form in which it is consumed. This consumable liquid beverage form will be, for example, hot or iced full strength coffee or tea, either as freshly brewed or steeped, or reconstituted. Greater amounts than about 1% by weight may be added if desired, but generally are not required. An amount as low as 0.1%, or even less, is generally effective for substantial flavor improvement of tea and coffee. In any event, amounts of cyclodextrin in excess of 1% may be used without fear of adversely affecting the taste qualities of the extracted beverage compositions, because cyclodextrin is substantially inert to the taste.

Cyclodextrin and its derivatives are known as complexing and clathrating agents. One theory, that may explain the mode of operation of the present invention, is that the cyclodextrin forms a complex with the bitter or other undesirable principle present in the liquid that is being treated. It is an advantage of this invention that the complexed undesirable taste factors need not be separated from the beverage compositions. Moreover, separation may be a disadvantage, from the economic standpoint. The cyclodextrin is presumed to be present in the liquid form of the beverage as a clathrate or complex with the undesirable taste factors which may be present in the beverage composition, although in many cases, excess, uncomplexed cyclodextrin may also be present.

While simple solution of the cyclodextrin in the beverage composition is one mode of removing the bitter or other undesirable principles, good results are also achieved by incorporating cyclodextrin in a filtration aid such as, for example, diatomaceous earth, where the beverage composition is to be filtered. Upon filtration, the undesirable principles are either removed from the beverage by complexing with the cyclodextrin and retention in the filtration medium, or are left in the beverage but in complexed, tasteless form, combined with the cyclodextrin.

If the beverage is to be treated for the removal or nullification of undesirable principles by filtration or related techniques, the cyclodextrin may be used as such, or it may be dispersed in a solid, particulate filtration medium, or it may be crosslinked to reduce its solubility. For example, the cyclodextrin may be reacted with epichlorhydrin, formaldehyde, phosphorus oxychloride, or the like, to crosslink it sufficiently to have little or no solubility, while nevertheless leaving it efficacious for the removal of undesirable principles.

In another variation of the invention, the cyclodextrin, either per se or slightly cross-linked, is first complexed with an edible material of a bland or acceptable flavor. It is then brought into intimate contact with the liquid beverage, and displacement occurs. The bitter principle is complexed, and the edible material of bland or acceptable flavor is released, either in its entirety or in part. For example, a complex with a mild coffee essence can be used to treat coffee, to trap any undesirable flavor principles while releasing the coffee essence into the coffee beverage.

Similarly, cyclodextrin derivatives may be employed. The derivative selected must be efficacious for the removal of bitter or other undesirable principles, and may be either an insoluble derivative or a soluble edible derivative.

In addition, the cyclodextrin material, in whatever form used, may be mixed with the ground coffee, tea leaves, or extract concentrate, and may be brought into contact with the beverage when water is brought into contact with the grounds, leaves or concentrate, respectively.

The several homologous cyclodextrins have internal openings, of different sizes, and these openings are believed to increase in size as the number of cyclic anhydroglucose units increase in the torus molecule. It is theorized that the objectionable taste factors are clathrated by being included in the opening of the molecule, but such objectionable taste factors may otherwise form complexes with the cyclodextrin to reduce or remove their objectionable effects in the liquid beverage compositions. The use of $\beta$-cyclodextrin has been found to lead to successful results in practicing the present invention, but a mixture of several homologous cyclodextrins has also been employed successfully, and has the advantage of extending the range of sizes of the molecular openings, so as to increase the probability of complexing any objectionable taste factors which may be present. The mixtures of homologous cyclodextrins are used in the same general amounts as indicated previously.

The extracted beverage products, with which this invention is concerned, are those produced by hot water extraction of plant sources. By the term "plant source" is meant those plant leaves and those plant beans which have found acceptance for preparing ingestible or consumable hot beverages. The principal plant bean is, of course, the coffee bean, although other beans such as the cocoa bean may be included. The principal plant leaf is, of course, tea, although other plant leaves are included such as various herbs and vegetable leaves.

One method of preparing the beverage compositions of the invention comprises the step of mixing, for example, by agitating or simply adding a small but effective amount of cyclodextrin to the beverage product, whether in liquid, concentrated liquid, or solid form. If the hot, aqueous extracted, full strength beverage is to be concentrated either to a low water content or to the dry form, the cyclodexrin may be added optionally to the product before or after the concentrate is prepared. It is not required that the cyclodextrin be uniformly distributed or that the beverage form and the cyclodextrin be even well mixed, at this point, because the cyclodextrin will be dissolved once the concentrate is reconstituted with water. The cyclodextrin which is added to the composition should be present in an amount such that its concentration is well within the limits of solubility of the cyclodextrin. If it is desired to add cyclodextrin in a concentration above that of $\beta$-cyclodextrin, for example, the more soluble derivatives of cyclodextrin may be used, such as, for example, an edible quaternary amino ether derivative which imparts cationic properties and increases the solubility of the cyclodextrin, as disclosed in U.S. Pat. 3,453,257.

It is generally preferred to add the cyclodextrin to a hot aqueous extract because it is believed that the undesirable taste factors are complexed to a substantial extent at such a time. The undesirable taste factors then remain complexed, even during the process of forming a concentrate with a substantially lowered water content, and even during the further process of conversion to a dry concentrate form.

It is an advantage of this invention that the complexed undesirable taste factors need not be separated from the hot aqueous beverage compositions. In fact, it is preferred that they not be separated because no advantage accrues from such a separation, and it would even be a handicap when considering the added complex processing and consequent increased costs.

The invention will be more fully understood from the following demonstration thereof, in which all parts and percentages are by weight unless expressly stated to be otherwise.

EXAMPLE

Two beakers, each containing two liters of coffee, were held about 90° C. for 8 hours. The coffee had been prepared in the usual way, using about 1 oz. of ground coffee beans with 6 oz. of water. One beaker of coffee was designated as the control, and it contained no cyclodextrin. The other beaker was designated as the test, and it contained 2 grams, or 0.10%, of $\beta$-cyclodextrin, throughout the entire period.

A taste panel was then employed, using the triangle technique to compare the taste qualities of the control beaker and the test beaker containing the $\beta$-cyclodextrin.

A taste panel then assayed both portions by the triangle technique of testing. The taste panel members reported that the test portion had little or no bitter taste whereas the control portion had a distinctly bitter flavor.

Similar results are obtained with tea. The beneficial effects persist even when the treated beverage extract is concentrated and frozen or dried. While direct addition and dissolution of cyclodextrin is simple, and is therefore a preferred mode of practice of the invention, other modes of practice are readily available, as has already been pointed out.

A level of addition of about 0.10% is very effective in eliminating bitterness in most tea and coffee preparations, even those obtained at higher extraction temperatures, or long extraction times, than are now common. However, for bitter beans or leaves, higher addition levels are desirable. The amount of cyclodextrin required seldom exceeds 1% by weight of the beverage, in consumable form. Moreover, for beverages that are substantially free from bitterness without treatment, amounts less than 0.10% may be used.

Another important advantage of the invention is that greater yields of extracted beverage may be obtained in commercial operations, by making the extractions at higher temperatures and/or pressures than those now considered as practical, and/or for longer times. Any undesirable taste factors which happen to be extracted under the more severe conditions will be complexed or removed by the cyclodextrin or other treatment in accordance with this invention.

Still another important advantage of the invention is the stability of the cyclodextrin and of its benefivial effects. This permits the use of cyclodextrin for improving and stabilizing the taste of liquid coffee and tea concentrates that are exposed to air over long periods of time, as in automatic vending machines. Moreover, the cyclodextrin treating material may reside, without loss of its beneficial effect, in a beverage concentrate that is dried or frozen, for later reconstitution to consumption strength.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:
1. A process for eliminating undesirable taste components from an aqueous beverage selected from the group consisting of coffee and tea which process comprises:
   placing the beverage in intimate contact with a quantity of cyclodextrin sufficient to complex the undesirable taste components and not exceeding about 1% by weight of the aqueous beverage; and
   recovering an aqueous beverage of improved taste.
2. A process in accordance with claim 1 wherein the cyclodextrin is placed in intimate contact with the aqueous beverage by agitation therewith.
3. A liquid beverage that comprises an extract selected from the group consisting of coffee and tea and that includes a dissolved complex consisting essentially of bitter principles and cyclodextrin, the cyclodextrin being present in an amount from that sufficient to complex the bitter principles up to about 1% by weight of the liquid beverage.

References Cited

UNITED STATES PATENTS

| | | | |
|---|---|---|---|
| 2,687,355 | 8/1954 | Benner et al. | 99—71 |
| 2,827,452 | 3/1958 | Schlenk et al. | 260—209 |
| 3,061,444 | 10/1962 | Rogers et al. | 99—140 |
| 3,140,184 | 7/1964 | Robbins et al. | 99—28 |

OTHER REFERENCES

Chemical Abstracts, vol. 64, 1966, p. 16687a.
M. Sivetz: Coffee Processing Technology, vol. 1, p. 358, Avi Publ. Co., Westport, Conn., 1963.
Whistler: Starch; Chemistry and Technology, Academic Press, Inc., New York, 1965, p. 244.

MAURICE W. GREENSTEIN, Primary Examiner

U.S. Cl. X.R.

99—77, 152